United States Patent [19]
Looney et al.
[11] 3,836,369
[45] Sept. 17, 1974

[54] DIAZO PHOTOSENSITIVE COMPOSITION

[75] Inventors: Catharine E. Looney; Rudolph H. Michel, both of Wilmington, Del.; Ronald A. Sahatjian, Watertown, Mass.

[73] Assignee: E. I. du Pont de Nemours and Company, Wilmington, Del.

[22] Filed: Sept. 5, 1972

[21] Appl. No.: 286,132

[52] U.S. Cl. .......................... 96/91 R, 96/49, 96/75, 95/12.2, 178/5.2 D, 178/6.6 TP, 178/6.7 R
[51] Int. Cl. ....... G03c 1/54, G03c 1/58, G03c 1/60
[58] Field of Search .......................... 96/91 R, 75, 49

[56] References Cited

UNITED STATES PATENTS

| | | | |
|---|---|---|---|
| 2,532,126 | 11/1950 | Slifkin et al. | 96/91 R |
| 2,537,919 | 1/1951 | Slifkin et al. | 96/91 R |
| 2,717,832 | 9/1955 | Sulich | 96/91 R |
| 2,792,303 | 5/1957 | Sanders et al. | 96/91 R X |
| 3,248,220 | 4/1966 | Van Rhijn | 96/91 R |
| 3,565,629 | 2/1971 | Usbeck | 96/91 R |
| 3,573,051 | 3/1971 | Gray | 96/91 R |
| 3,585,033 | 6/1971 | Desjarlais | 96/91 R |
| 3,622,325 | 11/1971 | Yoshida | 96/91 R |
| 3,708,301 | 1/1973 | Muller | 96/91 R |

FOREIGN PATENTS OR APPLICATIONS

| | | | |
|---|---|---|---|
| 1,558,142 | 1/1969 | France | 96/91 R |
| 1,094,374 | 12/1967 | Great Britain | 96/91 R |
| 1,247,050 | 9/1971 | Great Britain | 96/91 R |

*Primary Examiner*—Charles L. Bowers, Jr.

[57] ABSTRACT

Acid-stabilized, light sensitive azo dye-forming compositions comprising a mixture of at least one light sensitive diazonium salts from each of a fast group and a slow group and a mixture of coupler components from each of two groups. These compositions are capable of producing low-contrast images over a wide latitude and are especially useful for electronic video recording systems.

3 Claims, No Drawings

DIAZO PHOTOSENSITIVE COMPOSITION

BACKGROUND OF THE INVENTION

This invention relates to photography and, more particularly, to light-sensitive, diazo-type, image-forming compositions.

Diazo-type compositions are extensively used for line prints and microfilm copies. A "two-component" composition contains both a light-sensitive diazo component and a coupler or developer. An acid stabilizer is present to prevent premature reaction between diazo compound and coupler.

In an imaging process, the light striking the diazo compound decomposes it, leaving unexposed diazo compound available for subsequent reaction. After exposure, a basic reactant such as ammonia is used to overcome the effect of the stabilizer and permit reaction between the unexposed diazo compound and the coupler to form a dye and, therefore, an image.

Neutral diazo-type image systems, i.e., producing an image of black, gray and white, are known in the art. They are very similar in appearance to those produced by conventional silver-based film. It may be desirable that the image to be produced be a "low-contrast" image, i.e., one having a wide latitude over which graded tones of gray are produced. U.S. Pat. No. 3,573,051 to Gray concerns diazo-type compositions generally suitable for such purposes.

Electronic video recording (EVR) is a system for providing film cartridges or cassettes of pre-recorded motion pictures to be played by the viewer on a television set. As one source puts it, EVR will be to a television set what a record player is to a radio. Essential to the success of EVR is the high-quality, low-cost reproduction of motion pictures onto cassettes in large volume and at high speeds. The present system starts with a source which may be a movie film or a television program either in color or in black and white. From that source a pre-edited master film is produced. The master film is then used to produce a large number of copies for the cassettes. If the picture is to be in color, the frames are in two sections, one section containing the light and dark areas defining the image, and the other section containing color information. Both sections of the frame are monochromatic with the color information consisting of a series of parallel monochromatic lines modulated in amplitude and phase. Details of such a process are set forth in Goldmark et al., U.S. Pat. No. 3,609,228, and Goldmark and Glenn, U.S. Pat. No. 3,535,992.

Two-component diazo-type compositions provide low-contrast image reproduction at a lower cost than silver-based films. However, in the EVR process, the diazo-type prints are read by instrument rather than the human eye. For this reason, it becomes important to provide low-contrast prints with good resolution over a wide latitude at the wave lengths where the print is to be read. The term "wide latitude" refers to the range over which the density of the print corresponds to the density of the master and the term "resolution" means linearity of contrast throughout the latitude.

SUMMARY OF THE INVENTION

It is found in accordance with this invention that low-contrast prints with good resolution over a wide latitude suitable for EVR can be produced from an acid-stabilized, light-sensitive azo dye-forming composition comprising:

(A) a mixture of fast and slow light-sensitive diazonium salt components selected from each of Group 1 (fast group)
(1) 2,5-diethoxy-4-morpholino benzene diazonium salt,
(2) 4-pyrrolidino-3-methyl benzene diazonium salt; and
Group 2 (slow group)
(1) 4-(diethylamino) benzene diazonium salt, and
(2) 4-(diethylamino)-2-methyl benzene diazonium salt, wherein the mole ratio of Group 1 component to Group 2 componet ranges from 4:1 to 1:4, preferably from 3:2 to 1:2; and
(B) a mixture of coupler components selected from each of Group 1
(1) cyanoacetyl morpholide, and
(2) N(N'-morpholinyl-γ-propyl)-2-hydroxy-3-naphthamide; and
Group 2
(1) diresorcinol sulfide, and
(2) monohydroxyethylether of resorcinol, wherein the mole ratio of Group 1 component to Group 2 component ranges from 1:2 to 1:6, preferably from 1:3 to 1:5.

DETAILED DESCRIPTION OF THE INVENTION

The fast diazonium salts are the compound 2,5-diethoxy-4-morpholino benzene diazonium salt, also known as p-diazo-2,5-diethoxy-4-morpholino benzene salt, having the formula

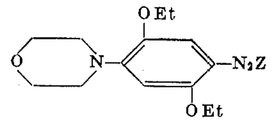

and the compound 4-pyrrolidino-3-methyl benzene diazonium salt, also known as p-diazo-4-pyrrolidino-3-methyl benzene salt, having the formula

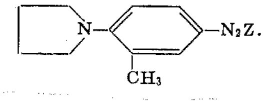

The slow diazonium salts are the compound 4-(diethyl-amino) benzene diazonium salt, also known as p-diazo-N,N-diethylaniline, having the structure

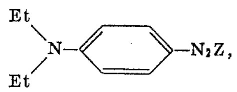

and the compound 4-(diethylamino)-2-methyl benzene diazonium salt, also known as p-diazo-N,N-diethyl-3-methyl aniline, having the structure

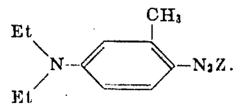

One group of couplers includes cyanoacetyl morpholide, having the structure

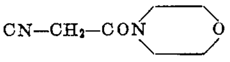

and N(N'-morpholinyl-γ-propyl)-2-hydroxy-3-naphthamide, having the structure

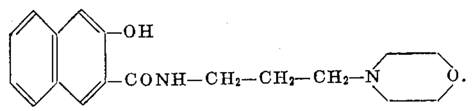

The other group of couplers includes diresorcinol sulfide and monohydroxyethylether of resorcinol.

More than one member of each of the foregoing groups may be used in the same composition. It is preferred to use a mixture of (1) diresorcinol sulfide and (2) monohydroxyether of resorcinol in a mole ratio of (1) to (2) ranging from about 1:15 to 1:5.

The composition is used with a matrix polymer or binder as known in the art. A preferred binder is cellulose acetate butyrate (CAB). In general, the total amount of couplers and diazo compounds will be from about 5 to 15 parts by weight per 100 parts of binder.

The composition contains acid stabilizers known in the art. Preferred is a combination of citric acid and 5-sulfosalicylic acid. The total equivalents of nonvolatile acid must exceed the sum of the equivalents of tertiary amine base [$K_a \geq 10^{-3}$].

Other additives may be added to the composition such as ultraviolet absorbers, development accelerators, stabilizers and handling aids.

A solvent system of 40 parts methyl ethyl ketone, 40 parts of methyl alcohol and 20 parts of ethanol is suitable but flammable. A suitable nonflammable solvent system employs mixtures of methylene chloride with a minor amount of isopropyl alcohol.

The support film may be any of several known in the art, e.g., a cellulose ester such as cellulose acetate, polyethylene terephthalate (PET), polystyrene, polycarbonate, or polyolefin. When PET film is employed as the base, it is preferably a 200 to 250-gauge photographic grade PET film treated to enhance adhesion. Preferred treatments are the use of swelling agents such as halogenated acids and aldehydes, saran coating, such as in Alles, U.S. Pat. No. 2,627,088, and polyurethane coating.

Although the composition can be applied to the base support by a number of known techniques, extrusion die coating is preferred since it gives extremely accurate control of coating thickness. The coated film is suitably dried in a tunnel and festoon dryer at about 100°C. The coating thickness of the image-forming composition is preferably determined by saturation optical density and lies between about 0.1 to 0.5 mils.

Light-sensitive films made according to this invention can be used to produce positive images because the azo dye coupling product forms only in relatively unexposed areas and does not form where light has destroyed the diazonium salt. Development is accomplished by hanging the exposed film in an ammonia atmosphere of controlled humidity and temperature as known in the art.

The sensitometric qualities of a film can be evaluated by using a calibrated Kodak No. 2 step wedge, with 21 steps between densities of 0.05 and 3.05. The optical density can be read at a given wavelength by a Macbeth TD-200 densitometer. The burnout density (BD), i.e., density of an overexposed strip, and the saturation density (SD) of an unexposed strip are also determined. For EVR film, the maximum useful density is preferably at least 1.55 and the minimum useful density is not greater that about 0.15.

The modulation transfer function (MTF) measurement is made by printing a master with wide lines of low contrast and closely-spaced lines of high contrast. The density of the master and print are read with a densitometer. The ratio of amplitudes of the 69 lines per mm. exposure to that at 15 lines per mm. is 240 percent for the master. If the print has poorer resolution than the master, the percentage is lower than 240 percent. For EVR film, an MTF of at least about 180 percent is preferred.

The invention will now be described in connection with the following examples wherein parts and percentages are by weight unless otherwise specified.

EXAMPLE 1

An image-forming composition containing about 4.7 percent of diazo active ingredients and 20 percent CAB resin is made up in a solution of 75 percent methylene chloride and 25 percent 2-propanol. The following active ingredients are added in order:

Stabilizers
15.9 parts citric acid
12.7 parts 5-sulfosalicylic acid
Couplers
3.8 parts diresorcinol sulfide
22.3 parts monohydroxyethylether of resorcinol
12.8 parts N(N'-morpholinyl-γ-propyl)-2-hydroxy-3-naphthamide.
Diazonium Salts
15.9 parts 4-(diethylamino)-benzene diazonium-fluoroborate.
17.7 parts 4-pyrrolidino-3-methyl benzene diazonium fluoroborate.

The solution has a viscosity in the 300 to 600 cps. range and is extrusion die coated onto either 2 or 2.5 mil photographic grade PET film primed with a 0.03 mil polyurethane coating. The optical density is about 1.75 to 1.8 at 3850 A. Printing of the film with a step wedge and multiburst shows it to have the following properties when read with a zenon arc and $S_4$ photo cell at 3850 A.

Average Gradient 1.25
Useful Maximum Output Density 1.60
Useful Minimum Output Density 0.13
Saturation Density 1.8
Burn-out Density 0.1
MTF 185

EXAMPLE 2

A suitable composition may be produced in a mixture of 1200 cc. methanol and 1200 cc. of methyl ethyl ketone. The ingredients are as follows:

Stabilizers
20 grams citric acid
16 grams 5-sulfosalicylic acid
Couplers
4.8 grams diresorcinol sulfide 21 grams N(N'-morpholinyl-γ-propyl-2-hydroxy-3-naphthamide 28 grams monohydroxyethylether of resorcinol Diazonium Salts, etc.

800 cc. acetone 20 grams 4(diethylamino)-benzene diazonium fluoroborate 20.8 grams 4-pyrrolidino-3-methyl benzene diazonium fluoroborate 1170 grams CAB resin The foregoing composition is suitable for EVR film purposes when coated on PET film as described herein and is capable of forming films with a MTF of about 190 percent.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

We claim:

1. In a light-sensitive azo dye-forming composition stabilized with a mixture of citric acid and 5-sulfosalicylic acid comprising a mixture of fast and slow light-sensitive diazonium salts and a mixture of coupler components, the improvement which consists in A. said mixture of fast and slow diazonium salt components being a mixture of
   1. 4-pyrrolidino-3-methyl benzene diazonium salt, and
   2. 4-(diethylamino)-2-methyl benzene diazonium salt; and B. a mixture of coupler components (1) and (2) wherein the ratio of (1) to (2) ranges from about 1:2 and 1:6, said components being:
   1. N(N'-morpholinyl-γ-propyl)-2-hydroxy-3-naphthamide, and
   2. a mixture of
      a. diresorcinol sulfide and
      b. monohydroxyethylether of resorcinol, wherein the ratio of (a) to (b) ranges from about 1:15 to 1:5.

2. The composition as defined in claim 1 wherein the mole ratio of Group 1 to Group 2 diazonium salts ranges from 3:2 to 1:2.

3. The composition as defined in claim 1 wherein the mole ratio of Group 1 to Group 2 couplers ranges from 1:3 to 1:5.

* * * * *

PO-1050
(5/69)

UNITED STATES PATENT OFFICE
CERTIFICATE OF CORRECTION

Patent No. 3,836,369 Dated September 17, 1974

Inventor(s) Catharine E. Looney, Rudolph H. Michel and Ronald A. Sahatjian

It is certified that error appears in the above-identified patent and that said Letters Patent are hereby corrected as shown below:

Column 3, line 21, "monohydroxyether" should read -- monohydroxyethylether --.

Column 6, lines 19, 20 and 21, claim 2 should read -- 2. The composition as defined in claim 1 wherein the mole ratio of diazonium salts (1) to (2) ranges from 3:2 to 1:2. --

Column 6, lines 22, 23 and 24, claim 3 should read -- 3. The composition as defined in claim 1 wherein the mole ratio of couplers (1) to (2) ranges from 1:3 to 1:5. --

Signed and sealed this 3rd day of December 1974.

(SEAL)
Attest:

McCOY M. GIBSON JR.
Attesting Officer

C. MARSHALL DANN
Commissioner of Patents